United States Patent [19]
Farino

[11] Patent Number: 4,899,430
[45] Date of Patent: Feb. 13, 1990

[54] ASSEMBLY FOR REMOVING A HEAD FROM A GOLF CLUB

[76] Inventor: Robert Farino, 12842 Jefferson Ave., Newport News, Va. 23602

[21] Appl. No.: 232,113

[22] Filed: Aug. 12, 1988

Related U.S. Application Data

[62] Division of Ser. No. 93,569, Sep. 4, 1987, Pat. No. 4,783,893.

[51] Int. Cl.$^4$ .............................................. B23P 19/04
[52] U.S. Cl. ......................................... 29/240; 29/256
[58] Field of Search .............. 29/240, 256, 257, 426.5, 29/447, 800; 156/344

[56] References Cited

U.S. PATENT DOCUMENTS

| | | | |
|---|---|---|---|
| 243,589 | 6/1881 | Mallinckrodt | 29/256 X |
| 348,182 | 8/1886 | Amidon | 29/240 X |
| 2,160,395 | 5/1939 | Wettlaufer | 29/256 X |

Primary Examiner—Charlie T. Moon
Attorney, Agent, or Firm—Neil F. Markva

[57] ABSTRACT

The method for removing a head portion with a shank section from a shaft of a golf club is effected by an assembly comprising securing means for fixing the position of a shaft of the golf club along the longitudinal axis of the shaft. Head grasping mechanism is mounted to rotate with respect to the securing mechanism and the longitudinal axis of the shaft secured in a fixed position. The head grasping mechanism is effective to hold the head during rotation thereof, thereby turning the head about an axis of rotation. Drive mechanism rotates the head grasping mechanism about the axis of rotation while applying pressure to the head in a direction parallel to the longitudinal axis and away from the fixed shaft. The method includes the step of heating the outer surface of the hosel section of the head portion for expanding the material therein with respect to the shaft. After the heating step, the pressure is applied to the head while the head portion is still heated. The head grasping mechanism is rotated until the head portion is removed from the shaft.

14 Claims, 3 Drawing Sheets

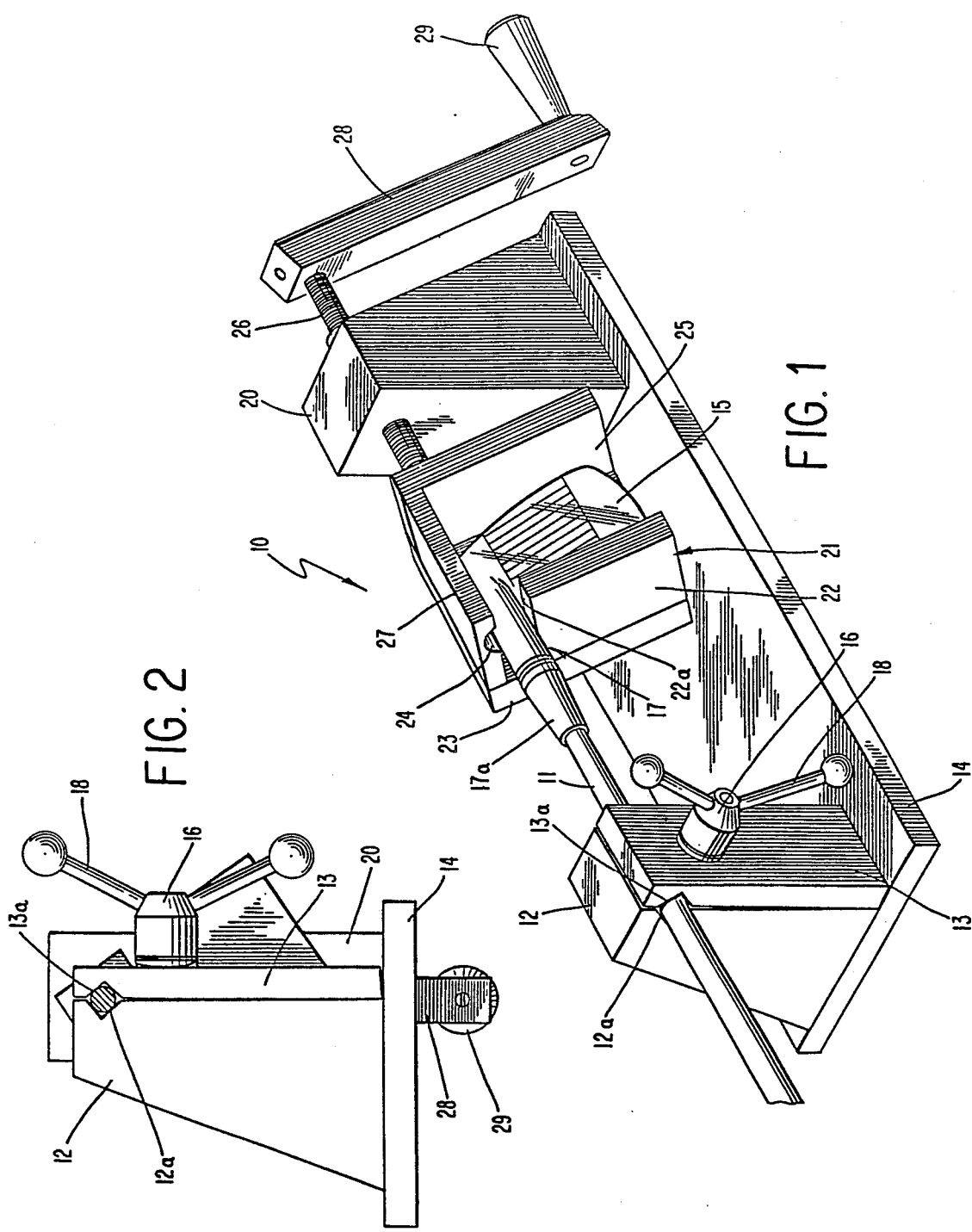

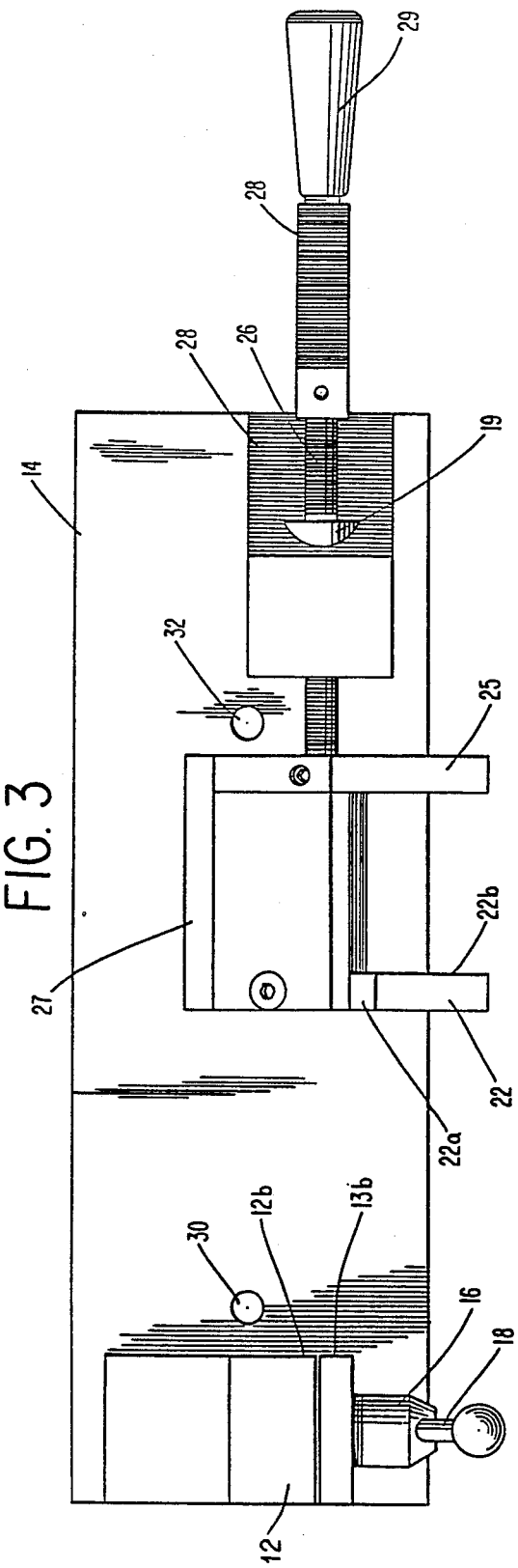
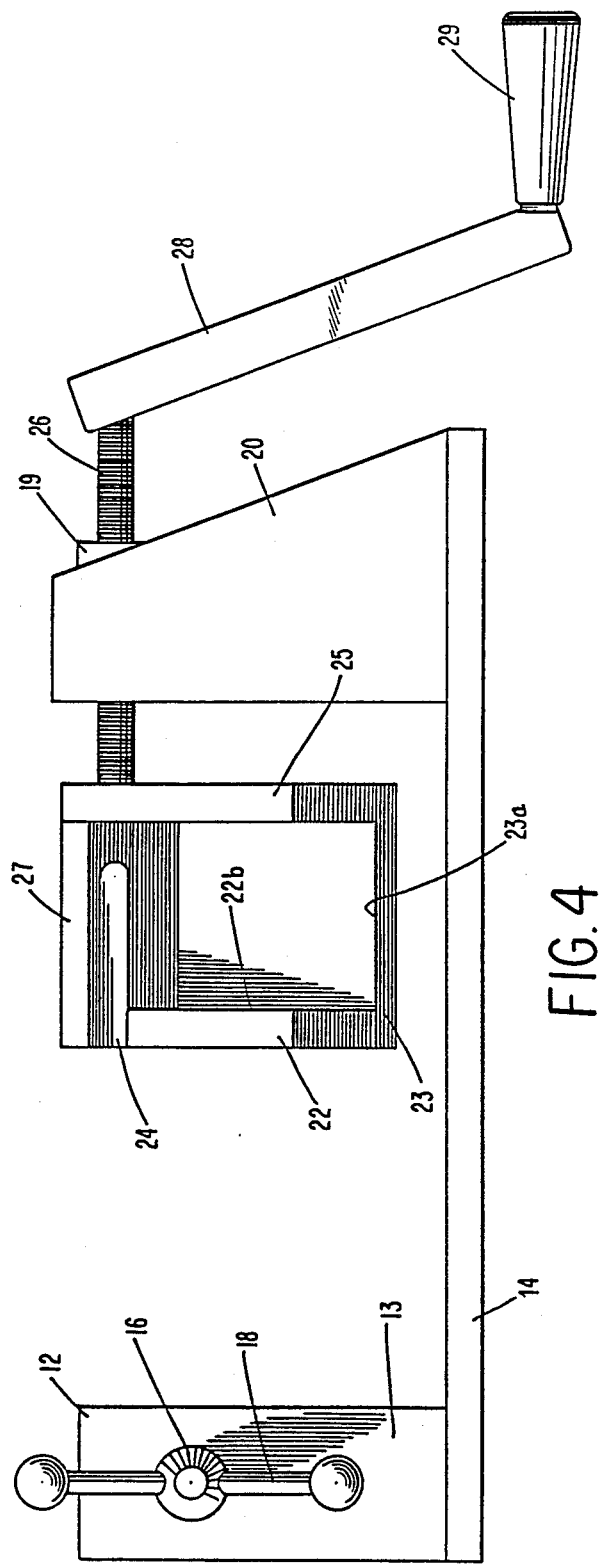

ASSEMBLY FOR REMOVING A HEAD FROM A GOLF CLUB

This is a division of application Ser. No. 093,569, filed Sept. 4, 1987, now U.S. Pat. No. 4,783,893.

FIELD OF THE INVENTION

This invention relates to an assembly and method for removing a head portion from a shaft of a golf club. More particularly, the invention relates to removing a head from an iron golf club by mechanically extracting its shaft from its hosel.

BACKGROUND OF THE INVENTION

Devices for removing heads from golf clubs are known. U.S. Pat. No. 2,160,395 shows a wood golf head and shaft secured by a screw after the end of the tapered shaft is forced into a shaped tapered socket in the club head. This known device causes a force to be applied to the terminal end of the club hosel section after the connecting screw has been removed. No rotation of the head occurs with respect to the shaft fixed along its longitudinal axis.

Golf heads must first be removed from shafts being replaced by new shafts. Such operation is necessary when replacing a whole new set of handles or when a shaft has been broken, bent or otherwise damaged making the golf club unusable. Known golf head extracting machines are extremely large and hydraulically operated making it impractical for golf pros or local golf club repair shops to use one.

Over the years, the means for fixing a shaft in the hosel of a golf head has varied. Today, many shafts are held in place using an adhesive such as apoxy. An individual requires much time and effort to remove. Iron heads are particularly difficult to remove because of the connecting mechanism between the shaft and hosel.

An iron is generally removed by hand without the availability of any mechanical tools. A particular problem is faced when removing a head from a broken shaft because of possible further breaking while the shaft is still in the hosel.

SUMMARY OF THE INVENTION

The primary object of the invention is to provide a golf head extracting assembly and method for removing the head portion from a shaft regardless of (1) the condition of that shaft, (2) how tightly the shaft is fitted to the hosel or (3) the type of adhesive material holding the shaft to the hosel.

The method of the invention comprises gripping a head portion with a head grasping means while fixing the position of the shaft along its longitudinal axis with a shaft securing means. Heat is applied to the outer surface of the hosel section with a heating device such as a propane torch.

The heating step expands the hosel section material with respect to the shaft. Thereupon, the head grasping means is rotated about an axis of rotation that is substantially co-extensive with the longitudinal axis of the shaft. While the head portion is being rotated, pressure is applied to urge the head away from the shaft securing means. The head grasping means is rotated until the head portion is removed from the shaft.

A ferrule member disposed on the hosel section may be removed after separating the head from the shaft. In this event, the shaft is withdrawn rearwardly in a direction along its longitudinal axis. At the same time, the ferrule member is abutted to prevent its movement with the shaft until the ferrule member is removed.

The head extracting assembly of the invention is used to effectuate the method for removing the head portion from the golf club. The assembly comprises securing means for fixing the position of the golf club shaft along its longitudinal axis. Head grasping means is mounted to rotate with respect to the securing means and the shaft longitudinal axis secured in a fixed position. The head grasping means is effective to hold the head for turning about an axis of rotation. Drive means rotates the head grasping means about the axis of rotation while applying pressure to the head in a direction parallel to the longitudinal axis and away from the shaft securing means.

A particular feature of the invention comprises securing means including a fixed jaw member, a movable jaw member and tightening means to clamp the shaft in a fixed position between the jaw members. The head grasping means has a structural configuration effective to receive the golf club head before clamping the shaft in the fixed position with the securing means. The jaw members include facing elongated shaft grooves for engaging the shaft from opposing directions to secure its fixed position. In a specific embodiment, the elongated shaft grooves are V-shaped in cross-section.

The securing means clamps the golf club shaft at a location close enough, if necessary, for the head portion to engage the jaw members while allowing the head portion to be turned about the axis of rotation. Thus, the assembly can remove a head portion from a short broken shaft attached to the house.

Where the golf club head includes a ferrule, abutment means abut such ferrule to prevent its movement while withdrawing the shaft along its longitudinal axis. In a specific embodiment of the securing means, the jaw members include end surfaces facing toward the head grasping means with a portion of the end surfaces constituting the abutment means adjacent the shaft grooves.

Another feature of the invention comprises head grasping means including alignment fixing means and pressure applying means. The alignment fixing means maintains the position of the golf head and hosel section by keeping the axis of rotation substantially parallel to the longitudinal axis of the shaft. The pressure applying means urges the head in a direction away from the securing means.

The alignment fixing means includes hosel section engaging means and a head bearing surface for applying a rotational force to turn the head about the axis of rotation. The hosel section engaging means includes spaced hosel bearing surfaces defining a hosel receiving slot therebetween. One of the hosel bearing surfaces has an elongated shank groove extending parallel to the axis of rotation.

In a specific embodiment, the head grasping means includes a gripping box means having a head resting wall member, a hosel contacting wall member, a pressure applying wall member and a driven wall member. The head resting wall member includes the head bearing surface. The hosel contacting wall member has a shank bearing surface including the elongated shank groove.

The pressure applying wall member includes a pressure bearing surface and a hosel bearing surface laterally spaced from the shank bearing surface. The pressure bearing surface contacts the top of the head being removed from the golf club shaft. The driven wall member is fixedly connected to the drive means for transmitting the rotational force from the drive means to the head grasping means.

A further feature of the invention comprises drive means including an elongated threaded rod fixedly secured at an inner end thereof to the head grasping means. Rod mounting means rotatably supports the elongated thread rod. Crank means fixed to its outer end is used to rotate the elongated rod.

The rod mounting means includes cam means for causing the elongated threaded rod to move away from the securing means when rotated in a first rotational direction and to move toward the securing means when rotated in a second rotational direction. The head is moved away from the securing means during the removing step. The head grasping means is moved toward the securing means to first position same to receive the head portion with the shaft then being fixed in position along its longitudinal axis.

In a specific embodiment, the rod mounting means includes a bore having a longitudinal axis substantially co-extensive with the axis of rotation. Cam means includes a threaded surface along the bore of the rod mounting means. A manually operated crank member connected to the outer end of the elongated thread rod is used to rotate the rod. The securing means and the drive means are fixably secured to an assembly base member with the head grasping means suspended therebetween.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a perspective view of a golf head extracting assembly made in accordance with the invention;

FIG. 2 is an end elevational view of the golf head extracting assembly of the invention from the shaft securing and of the assembly;

FIG. 3 is a top plan view of the assembly of the invention as shown in FIG. 1;

FIG. 4 is a front elevational view of the assembly of the invention;

DETAILED DESCRIPTION

Figure 5:
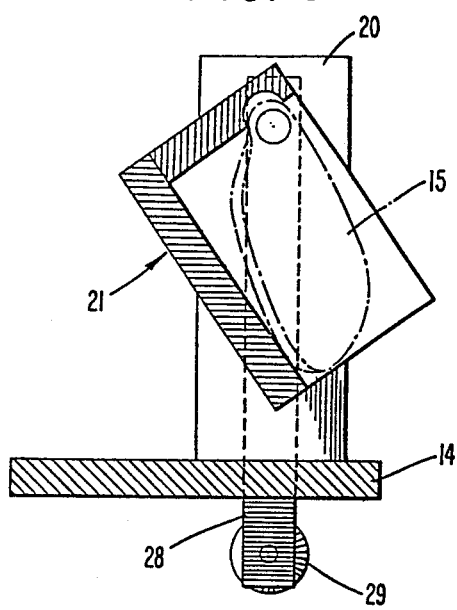
FIGS. 5, 6 and 7 are sectional views of the assembly of the invention showing the rotation of the head about the longitudinal axis of the shaft.

The head extraction assembly, generally designated 10, comprises a shaft securing mechanism at one end of a base member 14 and a drive mechanism at the other end of the base member 14. The shaft securing mechanism includes a fixed jaw member 12, a movable jaw member 13, and tightening means comprising a threaded hub member 16 and clamping handles 18. Bolts (not shown) can be used to fix assembly 10 to another surface by extending through openings 30 and 32.

The shaft securing mechanism clamps shaft 11 at a spaced location from the drive mechanism to turn head 15 and hosel section 17 about an axis of rotation. Jaw members 12 and 13 include respective elongated, shaft grooves 12a and 13a which face each other and engage shaft 11 from opposing directions thereby securing it in the fixed position as shown. In this specific embodiment, the elongated shaft grooves are V-shaped in cross-section.

End surfaces 12b and 13b of respective jaw members 12 and 13 are adjacent grooves 12a and 13a and constitute abutment means for holding ferrule 17a while withdrawing shaft 11 away from ferrule 17a along its longitudinal axis. Once head 15 has separated from shaft 11 tightening mechanism 16, 18 is loosened just enough to allow shaft 11 to be slipped rearwardly or away from head grasping mechanism 21. Other abutment means may be disposed between end surfaces 12b and 13b and ferrule member 17a to prevent its movement with shaft 11 until removed therefrom.

Head grasping mechanism 21 rotates with respect to the shaft securing mechanism and the shaft longitudinal axis secured in a fixed position as shown. Head grasping mechanism 21 holds head 15 for turning about an axis of rotation substantially parallel to the longitudinal axis of shaft 11. The axis rotation for head grasping mechanism 21 should be substantially co-extensive with the fixed longitudinal axis of shaft 11 to achieve the desired results.

Head grasping mechanism 21 comprises alignment fixing means and pressure applying means. The alignment fixing means includes hosel section engaging means and a head bearing surface for applying a rotational force to cause the head to turn about the axis of rotation. The hosel section engaging means includes spaced hosel bearing surface 22a and shank groove 24 defining a shank receiving slot therebetween. Elongated shank groove 24 extends parallel to the axis of rotation and to shaft longitudinal axis.

The alignment fixing means maintains the position of club head 15 and hosel section 17 by keeping the axis of rotation substantially parallel to the longitudinal axis of shaft 11. The pressure applying means is effective to urge head 15 in a direction away from the shaft securing mechanism once shaft 11 is fixed between jaw members 12 and 13.

Figure 6:
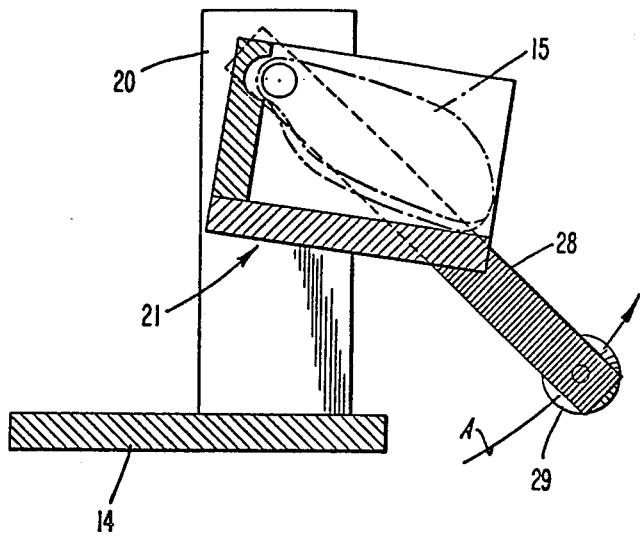
Figure 7:
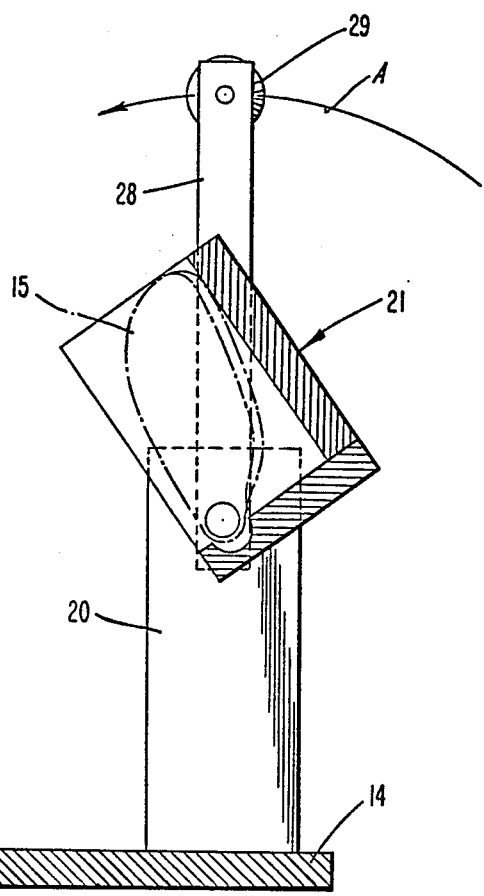
Figure 8:
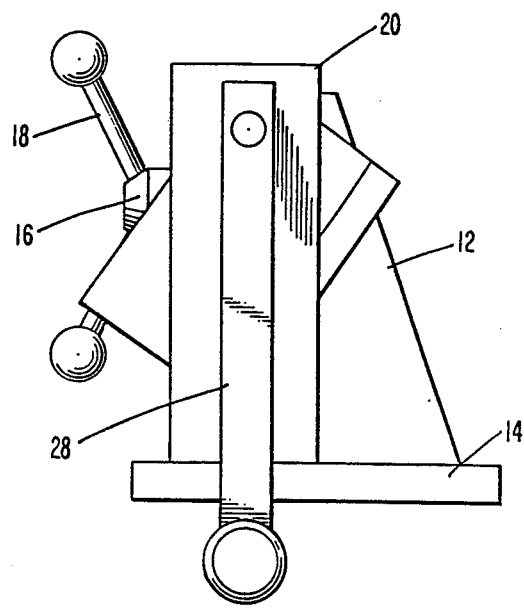
FIG. 8 is an end elevational view of the assembly of the invention from the drive end of the assembly.

Head grasping mechanism 21 includes a gripping box means having a head resting wall member 23, a shank section contacting wall member 27, a pressure applying wall member 22 and a driven wall member 25. The head resting wall member 23 includes a head bearing surface 23a resting against head 15 for applying a rotational force to cause head 15 to turn about the axis of rotation as shown in FIGS. 5, 6 and 7.

Shank contacting wall member 27 includes elongated shank groove 24. Pressure applying wall member 22 includes a hosel bearing surface 22a laterally spaced from shank groove 24. The pressure bearing surface 22b contacts the top of head 15 being removed from golf club shaft 11. The driven wall member 25 is fixedly connected to the drive mechanism inclusive of drive support member 20 fixedly secured to base member 14 as shown.

The drive mechanism includes an elongated threaded rod 26 fixedly secured at an inner end to head gripping box 21. Drive support member 20 rotatably supports elongated threaded rod 26 having crank arm 28 with handle 29 fixedly attached at its outer end. Crank handle 29 and arm 28 constitute means for rotating elongated rod 26.

Rod mounting support member 20 includes cam means causing elongated rod 26 to move away from jaw members 12 and 13 when rotated in a first rotational direction. When rotated in a second rotational direction opposite to the first rotational direction, box gripping means 21 moves toward shaft securing jaw members 12 and 13.

In this embodiment, an elongated bushing 19 having a threaded inner bore corresponding to outer threads on rod 26. The inner threaded bore constitutes the cam means for effecting movement of rod 26 with respect to rod mounting member 20. The threaded bore in rod mounting member 20 has a longitudinal axis substantially co-extensive with the axis of rotation and the shaft longitudinal axis. Head gripping box 21 of head grasping means is suspended between the shaft securing mechanism and drive means fixedly secured to assembly base member 14. Elongated rod 26 is sufficiently long to allow the broken shaft of a head portion to be clamped between jaw members 12 and 13 at a location close enough for the hosel section to engage the jaw members, if necessary, while allowing the head to be turned about the axis of rotation.

In operation, the distance between jaw members 12 and 13 and head gripping box 21 is first established based upon the available length of shaft 11. Head 15 is placed into gripping box 21 and the available length of shaft 11 is fixed between shaft grooves 12a and 13a. Heat is then applied along the hosel area 17 toward head 15 of the iron for a period of time in the range of 10 to 15 seconds. After applying the heat, crank handle 29 and arm 28 is rotated to turn the head in the direction shown in FIGS. 5, 6 and 7 for five to seven turns or until the iron head 15 is separated from shaft 11.

To remove ferrule member 17a, jaw members 12 and 13 are loosened very slightly using crank elements 16 and 18 to allow shank 11 to slide longitudinally within shaft grooves 12a and 13a. Shaft 11 is then slidingly withdrawn away from gripping box 21 until ferrule member 17a abuts end surfaces 12b and 13b. That is, shaft 11 is withdrawn rearwardly in a direction along its longitudinal axis while preventing movement ferrule member 17a against end surfaces 12b and 13b to prevent its movement with shaft 11 until furrule member 17a is removed from shaft 11.

The heating step along the outer surface of the hosel section 17 expands the material therein with respect to shaft 11. As head gripping box 21 is rotated as shown in FIGS. 5 through 7, head 15 is urged in a direction away from the shaft securing mechanism by top bearing surface 22b. Thus, pressure urges head 15 away from shaft securing mechanism while rotating head gripping box 21 about the axis of rotation. The heating together with a rotational bore breaks any bond between the head portion and shaft 11 to manually remove head 15 from shaft 11.

Older clubs may not be secured to their shafts using epoxy. Thus, care must be taken when applying the heat thereto. If too much heat is applied, the parts expand together and it becomes extremely difficult to get the head removed from its shaft. The idea is to slightly loosen with heat and then twist the head off by using assembly 10. Once the iron head 15 is removed, it may be placed in a small amount of water to enhance its cooling.

If a plastic ferrule member is not removed immediately after an iron head, the plastic may harden to the shaft and become difficult to remove. However, with the method and assembly of the present invention, the amount of time it takes to remove an iron head 15 allows the ferrule to be at the right temperature for removing in the manner described above.

While the assembly and method for removing a head from a golf club has been shown and described in detail, it is obvious that this invention is not to be considered as limited to the exact form disclosed, and that changes in detail and construction may be made therein within the scope of the invention without departing from the spirit thereof.

What is claimed is:

1. An assembly for removing a head portion from a golf club by extracting a shaft from a hosel section having an outer surface, said assembly comprising:
    (a) securing means for fixing the position of a shaft of a golf club along the longitudinal axis of the shaft,
    (b) head grasping means mounted to rotate about an axis of rotation that is substantially co-extensive with the longitudinal axis of the shaft secured in a fixed position, said head grasping means includes alignment fixing means and pressure applying means,
        said alignment fixing means being effective to maintain the position of the club head and hosel section for keeping the axis or rotation parallel to the longitudinal axis, and
        said pressure applying means being effective to urge the head in a direction away from the securing means,
    (c) said head grasping means being effective to hold the head portion at a laterally spaced distance from the securing means to allow the application of heat to the outer surface of the hosel section when the shaft is secured in said fixed position, and
    (d) drive means for rotating the head grasping means about said axis of rotation while applying pressure onto the head in a direction parallel to said longitudinal axis and away from said shaft secured in said fixed position.

2. An assembly as defined in claim 1 wherein said securing means includes afixed jaw member, a movable jaw member and tightening means to clamp the shaft in said fixed position.

3. An assembly as defined in claim 2 wherein said head grasping means has a structural configuration effective to receive the head of the golf club before the shaft is clamped in said fixed position with said securing means.

4. An assembly as defined in claim 2 wherein said jaw members include facing elongated, shaft grooves for engaging the shaft from opposing directions to secure the shaft in said fixed position.

5. An assembly as defined in claim 4 wherein said elongated, shaft grooves are V-shaped in cross-section.

6. An assembly as defined in claim 1 wherein abutment means are provided to abut a ferrule member of a hosel section while withdrawing the shaft away from said ferrule member along said longitudinal axis of the shaft.

7. An assembly as defined in claim 6 wherein said securing means includes a fixed jaw member, a movable jaw member and tightening means to clamp the shaft in said fixed position,
    said jaw members including end surfaces facing toward said head grasping means with a portion of said end surfaces constituting said abutment means.

8. An assembly as defined in claim 1 wherein said alignment fixing means includes shank section engaging means and a head bearing surface for applying a rotational force to cause the head to turn about said axis of rotation.

9. An assembly for removing a head portion from a golf club by extracting a shaft from a hosel section, said assembly comprising:

(a) securing means for fixing the position of a shaft of a golf club along the longitudinal axis of the shaft, (b) head grasping means mounted to rotate with respect to the securing means and the longitudinal axis of the shaft secured in a fixed position, (c) said head grasping means being effective to hold the head portion during rotation of the head portion about an axis of rotation, and (d) drive means for rotating the head grasping means about said axis of rotation while applying pressure onto the head portion in a direction parallel to said longitudinal axis and away from said shaft, (e) said head grasping means including alignment fixing means and pressure applying means, (f) said alignment fixing means being effective to maintain the position of the club head portion and hosel section by keeping the axis of rotation substantially parallel to the longitudinal axis of the secured shaft, (g) said pressure applying means being effective to urge the head portion in a direction away from the securing means, (h) said alignment fixing means including shank section engaging means and a head bearing surface for applying a rotational force to cause the head to turn about said axis of rotation, (i) said shank section engaging means including spaced shank bearing and hosel bearing surfaces defining a shank receiving slot therebetween with the shank bearing surface having an elongated groove extending parallel to said axis of rotation.

10. An assembly as defined in claim 9 wherein said head grasping means includes a gripping box means having a head resting wall member, a shank section contacting wall member, a pressure applying wall member and a driven wall member, said head resting wall member includes said head bearing surface supporting the head for applying said rotational force, said shank section contacting wall member includes shank groove having said elongated groove, said pressure applying wall member includes a second shank bearing surface laterally spaced from said first shank bearing surface and a pressure bearing surface for contacting the top of a head being removed from a golf club shaft, and said driven wall member being fixedly connected to said drive means for transmitting said rotational force from the drive means to the head grasping means.

11. An assembly for removing a head portion from a golf club by extracting a shaft from a hosel section, said assembly comprising:

(a) securing means for fixing the position of a shaft of a golf club along the longitudinal axis of the shaft, (b) head grasping means mounted to rotate with respect to the securing means and the longitudinal axis of the shaft secured in a fixed position, (c) said head grasping means being effective to hold the head portion during rotation of the head portion about an axis of rotation, and (d) drive means for rotating the head grasping means about said axis of rotation while applying pressure onto the head portion in a direction parallel to said longitudinal axis and away from said shaft, (e) said drive means including an elongated threaded rod fixedly secured at an inner end thereof to said head grasping means, mounting means for rotatably supporting the elongated threaded rod, and means for rotating said elongated rod, (f) said rod mounting means including cam means causing the elongated threaded rod to move away from said securing means when rotated in a first rotational direct and to move toward said securing means when rotated in a second rotational direction.

12. An assembly as defined in claim 11 wherein said rod mounting means includes a bore having a longitudinal axis substantially co-extensive with the axis of rotation, and said cam means including a threaded surface along the bore of said rod mounting means.

13. An assembly as defined in claim 11 wherein said drive means includes a manually operable crank member connected to the outer end of the elongated threaded rod for effecting rotation there.

14. An assembly as defined in claim 1 wherein said securing means and said drive means are fixedly secured to an assembly base member with a head grasping means suspended therebetween at the end of a thread rod rotatably supported on the drive means.

* * * * *